Feb. 16, 1960
W. SEIGLE
2,924,905
FISHING FLOAT
Filed July 24, 1958
2 Sheets-Sheet 1
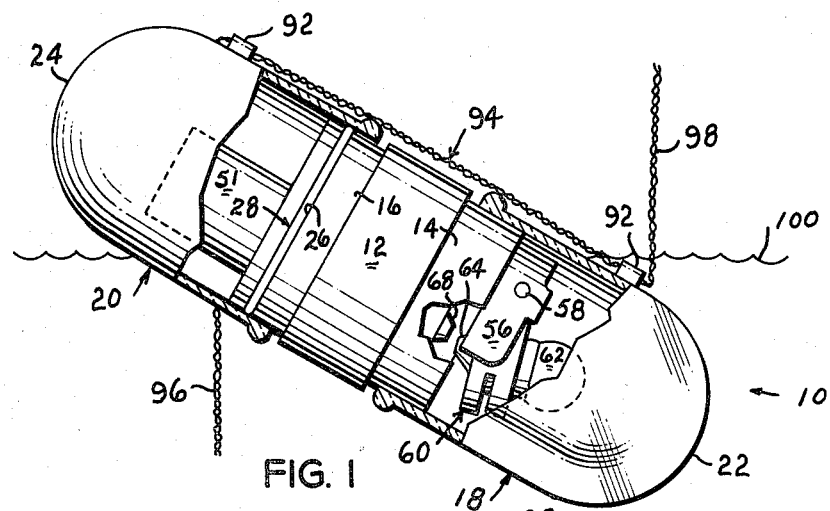
FIG. 1
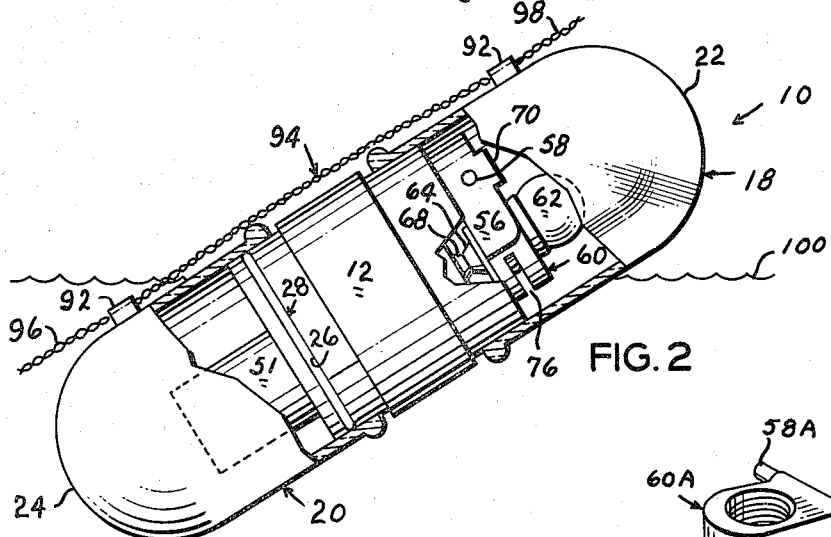
FIG. 2
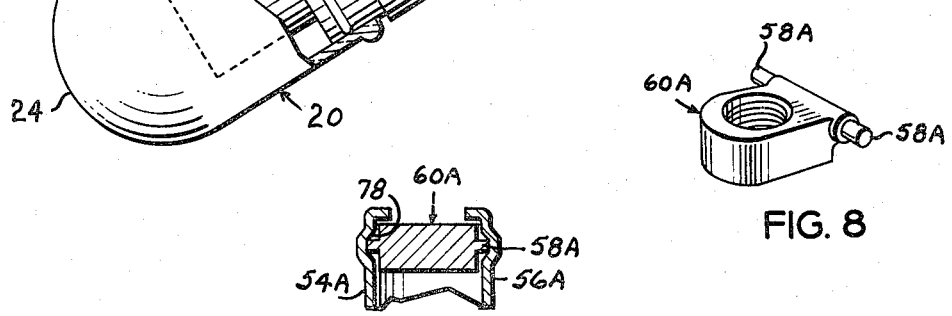
FIG. 9
FIG. 8
WILLIAM SEIGLE
INVENTOR.
BY *Loyal J. Miller*
ATTORNEY Feb. 16, 1960 W. SEIGLE 2,924,905
FISHING FLOAT
Filed July 24, 1958 2 Sheets-Sheet 2

WILLIAM SEIGLE
INVENTOR.

ATTORNEY

United States Patent Office 2,924,905
Patented Feb. 16, 1960

2,924,905
FISHING FLOAT
William Seigle, Dallas, Tex.

Application July 24, 1958, Serial No. 750,660

6 Claims. (Cl. 43—17)

The present invention relates to fishing floats or lures and more particularly to an illuminating fishing float for night fishing.

The instant invention is a continuation-in-part of an application filed by me in the United States Patent Office on May 22, 1957, under Serial No. 660,977 for Fishing Float, now Patent Number 2,869,274. This invention is also a further improvement over the United States Patent Numbered 2,544,968 which was issued to me on March 13, 1951.

In actual practice the device of the said patent tends to allow the bulb to become loose within the socket due partly to use of the device and in view of the type of threaded connection between the two.

It is therefore one of the principal objects of the instant invention to provide a means for removably securing the light bulb within its socket against accidental loosening of the same while in use.

A similarly important object is to provide a bulb socket means which may be readily adjusted for different sizes of threaded or bayonet base type bulbs.

An additional important object is to provide a means whereby the mass of the component parts of the device may be readily adjusted longitudinally of the exterior case thereof for altering the center of gravity, thereby altering the floating characteristics of the device relative to the surface of the water.

Another object is to provide a fishing float which will automatically be illuminated by a fish bite or strike on the line to which the device is secured.

A further object is to provide a fishing float or lure which is adaptable to be used on casting lines.

Still another object is to provide a float of this character in which the expendable parts thereof may be readily replaced.

Another object is to provide an electrical circuit means for a device of this class which will be more positive in maintaining operative electrical contact between the movable parts thereof.

An additional object is to provide a bracket and electrical circuit means which may be carried by a buoyant container to form a light emitting fishing lure.

Yet another object is to provide a fishing float of this class which may be adjusted to be illuminated when a fish bites the bait or which may be adjusted so that the light burns continuously, or not at all, as may be desired.

An additional object is to provide a fishing float which is light in weight and which is adaptable to be used on most any type of fishing line.

The present invention accomplishes these and other objects by providing a hollow elongated cylindrical body having removable end closure means thus forming a float. As least one of the end members is formed of transparent material. A resilient split sleeve is secured within a recess formed in the bore of the body for frictionally holding, in longitudinally adjustable relation, an elongated bracket. The bracket includes a pair of arcuate friction arms which carry a dry cell battery. A socket pivotally mounted on the bracket adjacent the terminal end of the battery carries a light bulb which is moved into and out of electrical contact with the battery terminal by gravitational attraction as the position of the float changes. A spring wire clip carried by the bracket resiliently bears against the socket and acts as a stabilizing means to prevent loss of electrical circuit contact due to slight movement of the float. Exteriorly the two end closure means are provided with connecting loops or eyes for securing the float to a fishing line or the like.

Other objects will be apparent from the following description when taken in conjunction with the accompanying two sheets of drawings, wherein:

Figure 1 is an elevational side view of the device, partly in section, illustrating the position the device normally assumes when used as an illuminating night fishing float;

Figure 2 is a view similar to Fig. 1 illustrating the approximate position of the device when tilted as a result of a fish bite on the line;

Figure 8 is a perspective view of a modified form of the bulb holding socket; and Figure 9 is a fragmentary vertical sectional view illustrating an alternate manner of mounting the bulb holding socket.

Like characters of reference designate like parts in those figures of the drawings in which they occur.

In the drawings:

Figure 3:
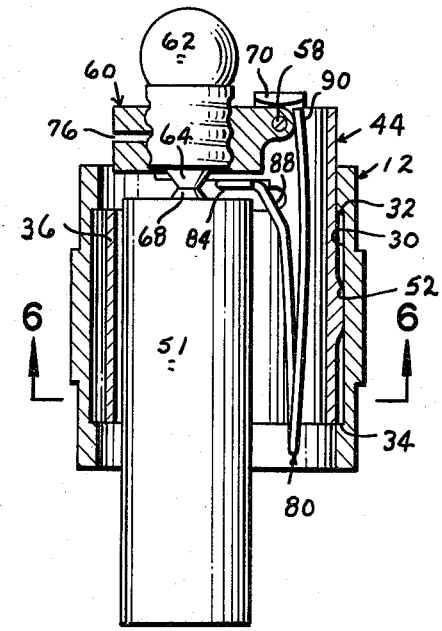
Figure 3 is a vertical sectional view of the device, partly in elevation and having the end closure means removed, the section being taken along the longitudinal axis of the device.

The reference numeral 10 indicates, as a whole, the device which is elongated and cylindrical-like in general configuration. The device 10 includes a central tubate body 12 having circumferentially reduced end portions 14 and 16 adapted for receiving tubular caps or closure means 18 and 20, respectively. The caps 18 and 20 have semi-spherical closed ends 22 and 24, respectively, thus forming, with the body 12, a water tight float. As a means for insuring that the fit between the caps and the reduced end portions of the body be water tight, the reduced end portions 14 and 16 may be each provided with an annular groove for receiving suitable packing material such as an O-ring. One such groove and ring is indicated on the end portion 16 at 26 and 28, respectively. At least one of the caps, preferably the cap 18, is formed of some transparent or translucent material for the purposes which will be readily apparent.

Figure 6:
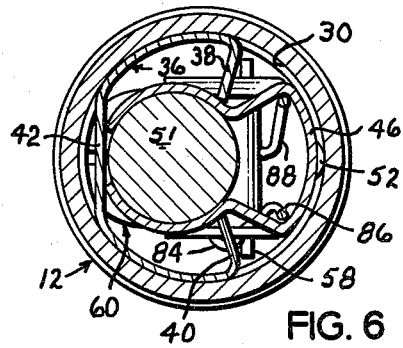
Figure 6 is a horizontal sectional view taken substantially along line 6—6 of Fig. 3.
Figure 5:
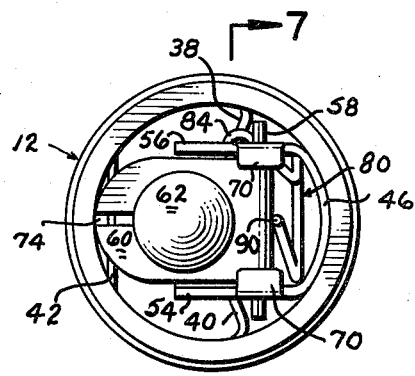
Figure 5 is an end view of the device with the adjacent end closure cap removed.

The body 12 is preferably formed of some suitable light weight material and diametrically is a size which will readily receive the component parts more fully described hereinbelow, and when assembled with the caps 18 and 20 will displace a quantity of water exceeding the mass of the device. Intermediate its ends the bore of the body 12 is circumferentially enlarged to form a groove or recess 30 (Figs. 3 and 6). As may be seen in Fig. 3 the recess 30 extends the greater portion of the longitudinal length of the body wall and is defined adjacent each end of the body by abrupt shoulders 32 and 34, respectively, perpendicular with respect to the longitudinal axis of the body for the purposes more fully disclosed hereinbelow.

A split sleeve 36, formed of resilient metallic material, having a wall thickness substantially equal with respect to the depth of the recess 30 and having a length substantially equal to the longitudinal length of the recess 30, is co-operatively received within the recess 30. A portion of the wall of the split sleeve 36 opposite the split or longitudinal opening as defined by the sleeve edge portions 38 and 40, forms a chord 42 which longitudinally subtends an arc of the recess 30 (Fig. 6). The longitudinal edge portions 38 and 40 of the split sleeve are bent or curved inwardly in co-operating spaced relation toward the co-incident longitudinal axis of the body and sleeve. The frictional fit between the split sleeve 36 and the body recess 30 is such that the sleeve may be manually rotated relative to the body 12 for the purposes which will presently be apparent.

An elongated bracket or battery holder 44 has one longitudinal side 46 thereof arcuately formed on a radius complemental with the radius of the bore of the body 12 and further includes a pair of co-operatively disposed friction arms 48 and 50 which extend laterally of the side 46. The transverse distance across the bracket from the arcuate side 46 to the free longitudinal edges of the arms 48 and 50 is slightly less than the diameter of the body bore so that the bracket may be frictionally slid longitudinally into the body 12 and within the sleeve 36 therein. As may be seen from an examination of Fig. 6 the bracket arms 48 and 50 extend from the arcuate side 46 inwardly toward the longitudinal axis of the body and are then arcuately formed complementally in a circular manner for receiving a small dry cell battery 51. The spacing between the longitudinal outer surfaces of the arms 48 and 50 at the point where the circular shape may be distinguished from the inwardly directed portion is such that this portion of the bracket 44 may be complementally received freely between the longitudinal edge portions 38 and 40 of the sleeve 36. The longitudinal free edges of the bracket arms are preferably disposed in spaced-apart relation against the inner surface of the sleeve chord portion 42 while the arcuate side 46 is received by the inner surface of the body bore. Intermediate its ends the bracket arcuate side 46 is provided with a laterally projecting lug 52 which extends outwardly of the side a distance substantially equal to the depth of the recess 30 thus maintaining frictional contact between the bracket and the inner wall forming the recess 30. Thus, the resilience of the sleeve 36 maintains the bracket 44 in selected longitudinal positions within the body 12. The overall length of the bracket 44 is substantially equal to the length of the body 12 and longitudinally the bracket arms 48 and 50 are substantially equal to the length of the split sleeve 36.

Figure 4:
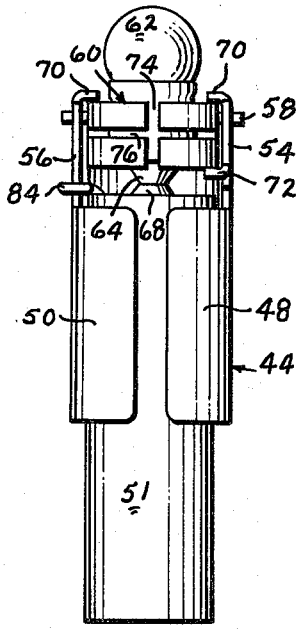
Figure 4 is an elevational view of the bracket and the electrical means associated therewith.
Figure 7:
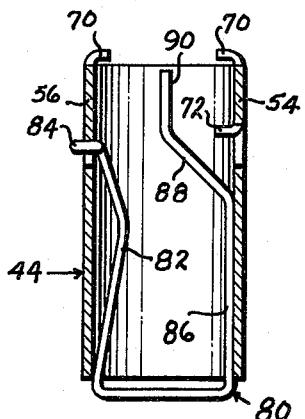
Figure 7 is a vertical sectional view taken substantially along line 7—7 of Fig. 5 illustrating the position of the wire clip within the bracket means.

The upper end portion of the bracket 44, as seen in Figs. 3, 4 and 7, is provided with a pair of parallel side members 54 and 56 which extend laterally of the arcuate side 46 in spaced-apart relation above the arms 48 and 50. A pivot pin 58 bridges the space between the side members 54 and 56 adjacent the upper end of the bracket, as viewed in Figs. 3 and 4.

A bulb carrier or socket 60 is pivotally mounted by the pin 58. The socket 60 may be secured to the pin 58 and pivot therewith or the pin 58 may be secured to the bracket permitting the socket to pivot about the pin. The socket 60 is preferably formed of some relatively soft metallic material, such as lead, and is centrally bored co-axially with respect to the circular formed bracket arms 48 and 50. The bore of the socket is provided with roll type threads for receiving a conventional relatively small lamp or bulb 62, such as a flashlight bulb. The base end 64 of the bulb is disposed inwardly of the bracket 44 toward the co-operating inwardly disposed terminal end 68 of the battery 51. Thus, it may be seen that the socket 60 is free to gravitationally swing or pivot toward and away from the terminal 68 of the battery for making and breaking an electrical circuit between the battery and the bulb which is completed by surface contact between the battery 51 and the bracket 44.

Movement of the socket 60 away from the battery 51 is limited by a pair of stops 70 which co-operatively project inwardly from the outwardly disposed end surfaces of the members 54 and 56 adjacent the opposing ends of the pivot pin 58 and above the upper surface of the socket 60, as viewed in Figs. 3 and 4. Similarly movement of the socket toward the battery is limited by an inwardly projecting stop or prong 72 (Figs. 4 and 7) which contacts the inwardly disposed surface of the socket 60. Thus, the socket 60 is free to pivot through only a relatively short distance as the position of the body 12 changes and this is preferably so in order that sudden changes of the position of the device will not result in the socket moving through an angle of travel which would result in sharp blows or a hammering action of the bulb base end 64 against the battery terminal 68 which would materially damage the bulb.

The free end portion of the socket 60 is provided with a vertical and a horizontal slot 74 and 76, respectively, as seen in Fig. 4, which extends inwardly and communicates with the threaded bore of the socket. The purpose of the horizontal slot 76 is to permit a slight compression between the respective opposing surfaces of this free end portion of the socket for effecting a shortening of the thread pitch of the socket and impinging the bulb 62 therein thus preventing accidental loosening of the same while in use. Similarly the vertical slot 74 permits some adjustment of the diametrical size of the threaded bore of the socket to compensate for variations in bulb thread sizes.

An alternate arrangement of the socket is illustrated in Figs. 8 and 9 and is indicated by the numeral 60A. This socket 60A omits the slots 74 and 76 of the socket 60 and is further characterized by the manner of its pivotal mounting between the members 54 and 56. Two relatively short pivot pins 58A are secured to opposing sides of the socket 60A in axial alignment. These pivot pins 58A may be inserted into co-operating perforations within the members 54 and 56 as is the pin 58. This arrangement insures a positive electrical contact between the bulb 62, socket 60A and the pins 58A. To further insure better electrical contact between these pins 58A and the bracket members the latter, indicated at 54A and 56A, may be formed with co-operating inwardly open recesses or indentations 78 (Fig. 9) which co-operate in frictionally receiving the ends of the pins 58A.

When the device is disposed in the position shown by Figs. 3 and 4 the mass of the socket 60 insures good electrical contact between the bulb and battery terminal 68, but when the device is disposed substantially horizontally, or at an angle approaching a horizontal position, the pin 58 supports most of the weight of the socket which results in poor or intermittent contact between the bulb and the battery terminal. This action results in a flashing "on and off" of the light emitted from the bulb. To overcome this flashing of the light bulb 62 a stabilizing means in the form of a spring wire clip 80 may be used.

The stabilizing means or clip 80 is carried by the bracket 44 inwardly of the arcuate side 46. The clip 80 is substantially U-shaped in general configuration and is adapted to be frictionally forced into the end of the bracket 44 opposite the socket end with one leg portion 82 contacting the lower end portion of the bracket, as viewed in Fig. 7, and extended upwardly therealong and terminating in an arcuately formed end 84 horizontally disposed between the upper edge surface of the bracket arm 50 and the lower edge surface of the member 56, as seen in Figs. 4 and 7, for preventing longitudinal movement of the clip relative to the bracket 44. The other leg 86 of the clip is extended upwardly along the opposite inward edge of the bracket arcuate edge portion a selected distance and is bent inwardly and upwardly, as at 88, and terminates in a vertically disposed end portion 90 which is arranged to bear against that adjacent portion of the socket through which the pin 58 is passed. Thus, the clip 80, resiliently retained by the bracket 44 and similarly bearing firmly against the socket 60, offers no appreciable amount of restraint to gravitational attraction on the socket 60 in pivoting on or with the pin 58, but tends to prevent small amplitudes of movement thereof and maintains the bulb in firm contact with the battery terminal, once such contact is made. Since the leverage of the clip end 90 on the socket 60 is small when compared to the leverage of the mass of the socket 60 in pivoting about the axis of the pin 58, gravitational attraction easily overcomes the resilient restraint of the clip when the device is definitely tilted.

*Operation*

In operation the device is assembled substantially as disclosed hereinabove. The caps 18 and 20 are each exteriorly provided with line engaging loops or eyes 92 through which a fishing line 94 may be passed, or to which the line may be secured. As viewed in Fig. 1, the left hand vertical portion 96 of the line 94 leads to the fish-hook and bait, not shown, while the right hand vertical portion 98 of the line 94 is connected with the fishing pole or reel, not shown. The mass of the bracket 44, battery 51 and socket 60 is longitudinally adjusted within the body 12 so that the device 10 floats in the water in substantially the position shown in Fig. 1. The upper surface of the water being indicated by the wavy line 100. Thus, as shown in Fig. 1, gravitational attraction for the socket 60 has moved the same so that the bulb 62 is out of contact with the battery terminal, the movement of the socket in this direction being liimted by the lugs 70. When a fish strikes or takes the bait the line portion 96 is pulled downwardly thus tilting or disposing the device 10 in substantially the position shown by Fig. 2. In this position gravitational attraction has swung the socket 60 so that the bulb 62 makes electrical contact with the battery terminal end 68, thus exciting the bulb filament which is readily visible through the cap 18.

The device 10 may be readily used as a fishing float or lure without the use of the illuminating qualities, as for example in day time fishing, by manually moving the battery longitudinally of the arms 48 and 50 away from contact position with the bulb 62 or by removing the battery from the device. Similarly the device may be used as a constantly illuminated night fishing float or lure by manually moving the battery so that the terminal end 68 thereof is in continuous contact with the base 64 of the lamp 62.

When adjusting the bracket 44 relative to the body 12 the lug 52 frictionally contacts the respective shoulder 32 or 34 and serves as a warning that further movement of the bracket relative to the body will disassemble the device. The bracket 44 may be rotated relative to the body 12 for positioning the mass of the device in the desired manner for floating with the loops 92 upwardly and when the bracket is thus rotated the respective side thereof will contact the edge portion 38 or 40 of the sleeve thereby rotating the latter with the bracket. This is for the purpose of insuring that the edges of the bracket arms 48 and 50 remain positioned against the inward surface of the sleeve chord 42. If the sleeve and bracket are not so related for co-operative rotation relative to the body the bracket arms 48 and 50 will be moved out of contact position 42 permitting the bracket to move freely back and forth within the body 12 when the device is in the floating position and defeating its intended purpose.

It seems readily obvious that various floating angles of the device relative to the surface of the water may be obtained by simply moving the bracket 44 longitudinally of the body 12 to change the center of gravity of the device.

The split socket 60 permits the use therewith of bayonet base type bulbs, not shown. This is accomplished by simply inserting the base end portion of the bulb into the bore of the socket and closing the socket around the bulb base by applying pressure to the socket on opposing sides of the vertical slot 74. Obviously the socket bore may be similarly enlarged to receive bayonet base type bulbs by spreading the sides of the socket and enlarging the width of the slot 74. Such enlarging or reduction of the size of the socket bore must be only of such extent that it will not cause or result in damaging the socket beyond the yield point of the material.

When the socket 60A is employed in place of the split socket 60, and is mounted as is illustrated in Fig. 9, use of the stabilizing clip 80 is not essential since frictional contact between pins 58A and the bracket sides 54 and 56 tend to steady the socket 60A. The clip 80 may similarly be omitted from the device when using the split socket 60, if desired.

The battery 51 and bulb 62 may be easily replaced by simply removing the respective cap 20 or 18.

It seems obvious that the bracket 44, socket 60 and associated bulb and battery may be inserted into any suitable container for forming an illuminated fishing plug or lure, if desired.

Obviously the invention is susceptible to some change or alteration without defeating its practicability, and I therefore do not wish to be confined to the preferred embodiment shown in the drawings and described herein, further than I am limited by the scope of the appended claims.

I claim:

1. An illuminating fishing float, comprising: a tubate body, said body having an annular recess formed in its inner wall forming a shoulder adjacent each end perpendicular with respect to the longitudinal axis of the body; tubular cap means having a bore adapted to be closely received by the respective ends of said body to effect a water tight seal, each of said cap means having a semispherical closed end; a split sleeve of resilient material rotatably carried by the inner wall of said body between said shoulders, the length of said sleeve being substantially equal to the distance between said shoulders, the longitudinal edge portions of said split sleeve defining the split being arcuately curved inwardly toward the longitudinal axis of said body, that portion of said split sleeve opposite the split forming a chord subtending an arc of the recess in said body; a battery holder longitudinally disposed between the inwardly curved edges of said split sleeve and extending transversely between the chord portion of said split sleeve and the inner wall of said body, said battery holder having a lug projecting laterally outward and frictionally engaged with the inner wall of said body defining the recess between said shoulders for engagement with the latter and limiting longitudinal movement of said battery holder relative to said body; a battery frictionally carried by said battery holder; a bulb carrier pivotally mounted on said battery holder adjacent the terminal end of said battery; stops integrally carried by said one end of said battery holder and engageable with opposing surfaces of said bulb carrier for limiting the pivoting movement of the latter; a light bulb threadedly supported by said bulb carrier in a manner to gravitationally swing into and out of circuit making contact with the terminal of said battery when the float is tilted longitudinally; and bulb carrier stabilizing means carried by the battery holder for frictional engagement with said bulb carrier and stabilizing the latter when the bulb is in circuit making contact with the battery terminal.

2. An illuminating fishing float, comprising: a tubate body, said body having an annular recess formed in its inner wall forming a shoulder adjacent each end perpendicular with respect to the longitudinal axis of the body; tubular cap means having a bore adapted to be closely received by the respective ends of said body to effect a water tight seal, each of said cap means having a semispherical closed end; a split sleeve of resilient material rotatably carried by the inner wall of said body between said shoulders, the length of said sleeve being substantially equal to the distance between said shoulders, the longitudinal edge portions of said splot sleeve defining the split being arcuately curved inwardly toward the longitudinal axis of said body, that portion of said split sleeve opposite the split forming a chord subtending an arc of the recess in said body; a battery holder longitudinally disposed between the inwardly curved edges of said split sleeve and extending transversely between the chord portion of said split sleeve and the inner wall of said body, said battery holder having a lug projecting laterally outward and frictionally engaged with the inner wall of said body defining the recess between said shoulders for engagement therewith and limiting longitudinal movement of said battery holder relative to said body; a battery frictionally carried by said battery holder; a bulb carrier pivotally mounted on said battery holder adjacent the terminal end of said battery; stops integrally carried by said one end of said battery holder and engageable with opposing surfaces of said bulb carrier for limiting the pivoting movement of the latter; and a light bulb threadedly supported by said bulb carrier in a manner to gravitationally swing into and out of circuit making contact with the terminal of said battery when the float is tilted longitudinally.

3. An illuminating fishing float, comprising: a tubate body having an annular recess formed in its inner wall forming a shoulder adjacent each end perpendicular with respect to the longitudinal axis of the body; tubular cap means having a bore adapted to be closely received by the respective ends of said body to effect a water tight seal, at least one of said cap means being capable of transmitting light rays; a split sleeve of resilient material rotatably carried by the inner wall of said body between said shoulders, the length of said split sleeve being substantially equal to the distance between said shoulders, the opposing longitudinal edge portions of said split sleeve being arcuately curved inwardly toward the longitudinal axis of said body, that portion of said split sleeve opposite the inwardly curved edges forming a chord subtending an arc of the recess in said body; a battery holder longitudinally disposed between the inwardly curved edges of said split sleeve and extending transversely between and frictionally engaging the chord portion of said split sleeve and the inner wall of said body, said battery holder having a lug intermediate its ends projecting laterally outward in frictional contact with the inner wall of said body between said shoulders for contacting the latter and limiting longitudinal movement of said battery holder relative to said body; a battery frictionally carried by said battery holder, said battery having a terminal end; a bulb carrier pivotally mounted on said battery holder for movement toward and away from the adjacent terminal end of said battery; inwardly projecting stops formed on said battery holder engageable with opposing surfaces of said bulb carrier for limiting the pivoting movement of the latter; a light bulb threadedly supported by said bulb carrier in a manner to gravitationally swing into and out of circuit making contact with the terminal of said battery when the float is tilted longitudinally; and bulb carrier stabilizing means carried by the battery holder for frictional engagement with said bulb carrier and stabilizing the latter against to and fro movement when the bulb is in circuit making contact with the battery terminal.

4. An illuminating fishing float, comprising: a tubate body, said body having an annular recess formed in its inner wall forming a shoulder adjacent each end perpendicular with respect to the longitudinal axis of the body; tubular cap means having a bore adapted to be closely received by the respective ends of said body to effect a water tight seal, at least one of said cap means being capable of transmitting light rays; a split sleeve of resilient material rotatably carried by the inner wall of said body between said shoulders, the length of said split sleeve being substantially equal to the distance between said shoulders, the opposing longitudinal edge portions of said split sleeve being arcuately curved inwardly toward the longitudinal axis of said body, that portion of said split sleeve opposite the inwardly curved edges forming a chord subtending an arc of the recess in said body; a battery holder longitudinally disposed between the inwardly curved edges of said split sleeve and extending transversely between and frictionally engaging the chord portion of said split sleeve and the inner wall of said body, said battery holder having a lug intermediate its ends projecting laterally outward in frictional contact with the inner wall of said body between said shoulders for contacting the latter and limiting longitudinal movement of said battery holder relative to said body; a battery frictionally carried by said battery holder, said battery having a terminal end; a bulb carrier pivotally mounted on said battery holder for movement toward and away from the adjacent terminal end of said battery; inwardly projecting stops formed on said battery holder engageable with opposing surfaces of said bulb carrier for limiting the pivoting movement of the latter; a light bulb supported by said bulb carrier in a manner to gravitationally swing into and out of circuit making contact with the terminal of said battery when the float is tilted longitudinally; and bulb carrier stabilizing means carried by the battery holder for frictional engagement with said bulb carrier and stabilizing the latter against to and fro movement when the bulb is in circuit making contact with the battery terminal.

5. An illuminating fishing float, comprising: a tubate body, said body having an annular recess formed in its inner wall forming a shoulder adjacent each end of the body, said body having a peripheral groove adjacent each end; a gasket disposed within each peripheral groove and projecting outwardly of the adjacent peripheral surface of each respective end of the body; tubular cap means having a bore adapted to be closely received by the respective ends of said body and form a fluid tight seal with said gaskets; a split sleeve rotatably carried by the inner wall of said body between said shoulders, the length of said split sleeve being substantially equal to the distance between said shoulders, the opposing longitudinal edge portions of said split sleeve being curved inwardly toward the longitudinal axis of said body, that portion of said split sleeve opposite the inwardly curved edges forming a chord subtending an arc of the recess in said body; bracket means adjustably carried longitudinally by said split sleeve and said body, the opposing sides of said bracket means contacting the inwardly directed end edges of said split sleeve for rotating the latter relative to said body when said bracket means is rotated, said bracket means having laterally extending friction arms contacting the chord of said split sleeve, said bracket means having a lug projecting laterally outward opposite said friction arms and frictionally contacting the inner wall of said body between said shoulders for contacting the latter and limiting longitudinal movement of said bracket means relative to said body; a battery held by the arms of said bracket means; a split socket pivotally mounted on the end of said bracket means adjacent the terminal end of said battery; lugs carried by said bracket means for limiting the movement of said split socket; a light bulb threadedly supported by said split socket in a manner to gravitationally swing into and out of circuit making contact with the terminal of said battery when the float is tilted; and stabilizing means carried by the the bracket for stabilizing the split socket while the bulb is in circircuit making contact with the terminal of said battery.

6. An illuminating fishing float, comprising: a tubate body, said body having an annular recess formed in its inner wall forming a shoulder adjacent each end of the body, said body having a peripheral groove adjacent each end; a gasket disposed within each peripheral groove and projecting outwardly of the adjacent peripheral surface of each respective end of the body; tubular cap means having a bore adapted to be closely received by the respective ends of said body and form a fluid tight seal with said gaskets; a split sleeve rotatably carried by the inner wall of said body between said shoulders, the length of said split sleeve being substantially equal to the distance between said shoulders, the opposing longitudinal edge portions of said split sleeve being curved inwardly toward the longitudinal axis of said body, that portion of said split sleeve opposite the inwardly curved edges forming a chord subtending an arc of the recess in said body; bracket means adjustably carried longitudinally by said split sleeve and body, the opposing sides of said bracket means contacting the inwardly directed end edges of said split sleeve for rotating the latter relative to said body when said bracket means is rotated, said bracket means having laterally extending friction arms contacting the chord of said split sleeve, said bracket means having a lug projecting laterally outward opposite said friction arms and frictionally contacting the inner wall of said body between said shoulders for contacting the latter and limiting longitudinal movement of said bracket means relative to said body; a dry cell battery held by the arms of said bracket means; a split socket pivotally mounted on the end of said bracket means adjacent the terminal end of said battery; lugs carried by said bracket means for limiting the pivoting movement of said socket; a light bulb supported by said socket in a manner to gravitationally swing into and out of circuit making contact with the terminal of said battery when the float is tilted; and resilient means carried by said bracket means for stabilizing the socket while the bulb is in circuit making contact with the terminal of said battery.

References Cited in the file of this patent

UNITED STATES PATENTS 2,544,968     Seigle ------------------ Mar. 13, 1951